United States Patent
Teraue

(10) Patent No.: US 8,749,841 B2
(45) Date of Patent: Jun. 10, 2014

(54) IMAGE PROCESSING APPARATUS, IMAGE PROCESSING METHOD, AND RECORDING MEDIUM STORING A PROGRAM THEREOF

(75) Inventor: Eiji Teraue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 842 days.

(21) Appl. No.: 12/878,457

(22) Filed: Sep. 9, 2010

(65) Prior Publication Data

US 2011/0058196 A1 Mar. 10, 2011

(30) Foreign Application Priority Data

Sep. 10, 2009 (JP) ................. 2009-209297

(51) Int. Cl.
- *G06F 15/00* (2006.01)
- *G06K 1/00* (2006.01)
- *H04N 1/40* (2006.01)
- *H04N 1/46* (2006.01)
- *G03F 3/08* (2006.01)

(52) U.S. Cl.
USPC ........... 358/1.9; 358/1.6; 358/3.23; 358/3.24; 358/504; 358/526

(58) Field of Classification Search
USPC .......... 358/1.9, 1.6, 2.1, 3.23, 3.24, 504, 518, 358/526
See application file for complete search history.

(56) References Cited

U.S. PATENT DOCUMENTS

| | | | | |
|---|---|---|---|---|
| 6,008,907 A | * | 12/1999 | Vigneau et al. | 358/1.9 |
| 6,755,498 B2 | * | 6/2004 | Revie et al. | 347/15 |
| 6,864,995 B2 | * | 3/2005 | Nogiwa et al. | 358/1.9 |
| 7,054,033 B2 | * | 5/2006 | Namikata | 358/1.9 |
| 7,239,425 B2 | * | 7/2007 | Namikata | 358/2.1 |
| 7,307,753 B2 | * | 12/2007 | Sasaki et al. | 358/1.9 |
| 7,349,111 B2 | * | 3/2008 | Horii | 358/1.13 |
| 7,397,572 B1 | * | 7/2008 | Horii | 358/1.13 |
| 7,460,283 B2 | * | 12/2008 | Saito | 358/515 |
| 7,576,897 B2 | * | 8/2009 | Tanaka | 358/523 |
| 7,599,096 B2 | * | 10/2009 | Yoshida | 358/3.01 |
| 7,623,141 B2 | * | 11/2009 | Brown Elliott et al. | 345/690 |
| 8,072,658 B2 | * | 12/2011 | Namikata | 358/518 |
| 8,390,889 B2 | * | 3/2013 | Iguchi | 358/3.01 |
| 2002/0180998 A1 | * | 12/2002 | Wu | 358/1.9 |

FOREIGN PATENT DOCUMENTS

| | | |
|---|---|---|
| JP | 10-250153 A | 9/1998 |
| JP | 2000-217007 A | 8/2000 |
| JP | 2005-167630 A | 6/2005 |

OTHER PUBLICATIONS

Rejection of the Application, dated Dec. 18, 2012, issued in corresponding JP Application No. 2009-209297, 5 pages in English and Japanese.

* cited by examiner

Primary Examiner — Barbara Reinier
Assistant Examiner — Jonathan Beckley
(74) Attorney, Agent, or Firm — Sughrue Mion, PLLC

(57) ABSTRACT

An image processing apparatus has a color chart condition setter for setting colorimetric values of a designated color as a reference color, and an image data generator for generating image data of pixel values calculated such that a plurality of color patches are arranged in a two-dimensional pattern on a print medium around the reference color set by the color chart condition setter, and color differences in an equal color space between adjacent ones of the color patches are represented by a substantially equal interval along a row or column of color patches.

11 Claims, 13 Drawing Sheets

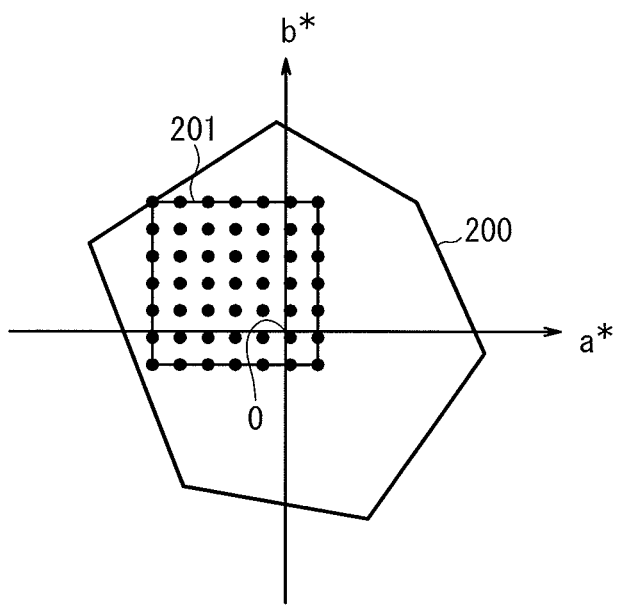

IMAGE PROCESSING APPARATUS, IMAGE PROCESSING METHOD, AND RECORDING MEDIUM STORING A PROGRAM THEREOF

CROSS-REFERENCE TO RELATED APPLICATION

This application is based upon and claims the benefit of priority from Japanese Patent Application No. 2009-209297 filed on Sep. 10, 2009, of which the contents are incorporated herein by reference.

BACKGROUND OF THE INVENTION

1. Field of the Invention

The present invention relates to an image processing apparatus, an image processing method, and a recording medium storing a program thereof for generating image data to print a color chart made up of a plurality of color patches on a print medium, entering identification information of a color patch selected to represent a color that is closest to a designated color from the color chart printed based on the image data, and making a color adjustment of a print based on such identification information.

2. Description of the Related Art

With significant advances in inkjet technology in recent years, it has become possible for inkjet printers to produce large color prints of high quality at high speeds. Inkjet printers are not only popular for private or home use, but nowadays also are widely used in commercial applications. Inkjet printers make it possible to print on POP (point of purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums, such as synthetic paper, thick paper, aluminum-evaporated paper, etc., resin mediums such as those made of vinyl chloride, PET, etc., and tarpaulin paper made of woven fiber cloth with synthetic resin films applied to both surfaces thereof.

Since advertisement prints are expected to be effective to arouse consumers' motivation to buy advertised products through visual sensations of the consumer, the color finish of such prints is of particular importance. Heretofore, there have been disclosed various color matching technologies, such as a method of generating an ICC (International Color Consortium) profile, a method of adjusting a designated color, etc., as a print color managing means. Such color matching technologies are applicable not only to inkjet printers but also to all types of digital printers, including those based on electrophotographic and thermosensitive principles, together with their peripheral devices across the board.

The method of adjusting a designated color referred to above comprises a method of making fine color adjustments of an area of interest in an image in order to bring the color into substantial conformity with a given color (designated color) designated by a color sample of color chips, while maintaining the color balance of the image as a whole. There have been disclosed various methods of adjusting a designated color.

For example, Japanese Laid-Open Patent Publication No. 2000-217007 discloses a method of bringing the impression of a designated color displayed on a display device and the impression of a color printed by a printing machine into conformity with each other. Specifically, Japanese Laid-Open Patent Publication No. 2000-217007 discloses a display window displayed on the display device, in which the displayed color is changeable, and a printed color chart of 27 colors, which are thought to be close to a designated color that is displayed (see FIGS. 4 and 5 of Japanese Laid-Open Patent Publication No. 2000-217007).

The operator sets a designated color that is to be displayed in the display window, presses a print button to print the color chart on the printing machine, selects one of the 27 colors of the color chart, which is closest to the designated color, and enters the number of the closest color into the display device, for thereby strictly approximating the impression of the designated color displayed in the display window by the impression of the color printed on the printing machine.

The 14th color at the center of the color chart of 27 colors represents a color of C, M, Y values that corresponds to the designated color, whereas the other colors of the color chart have C, M, Y components that are slightly different from each other by small quantities $\Delta C$, $\Delta M$, $\Delta Y$ (see FIG. 7 of Japanese Laid-Open Patent Publication No. 2000-217007).

A color range that can be reproduced by a printing machine is known as a gamut, which is defined depending on the colors and number of inks that are used by the printing machine in order to produce color images.

If the printing machine carries inks of colors C, M, Y, K (so-called process colors), but not optional inks of a designated color and similar colors, then the printing machine is required to reproduce the designated color based on a combination of the colors C, M, Y, K. A color matching process using a profile often fails to match the designated color efficiently.

For example, if the operator does not recognize that the designated color is a color outside of the gamut, then the operator searches in vain for a color patch, which is of the same color as the designated color, by repeating a process of printing and visually checking the color chart.

If the designated color falls within the gamut, but is near to the boundary thereof, then since it is difficult to predict printed colors with respect to C, M, Y, K values, the operator needs to be highly skilled and have many years of experience. If the operator is not skilled and experienced enough to perform such color adjustments, then it is tedious and time-consuming to match the designated color, and possibly an optimum color will not be selected.

According to the method disclosed in Japanese Laid-Open Patent Publication No. 2000-217007, if the designated color falls outside of the gamut, or falls within the gamut but is near the boundary thereof, then it takes a long period of time to adjust the designated color.

SUMMARY OF THE INVENTION

An object of the present invention is to provide an image processing apparatus, an image processing method, and a recording medium storing a program thereof, which are capable of reducing the time required to adjust a designated color when the designated color falls outside of a gamut, or falls within the gamut but is near the boundary thereof.

According to the present invention, there is provided an image processing apparatus including an image data generator for generating image data to print a color chart having a plurality of color patches of respective colors on a print medium, an input device for entering identification information of one of the color patches, which is selected from the color chart printed based on the image data, as having a color closest to a designated color, and a color converter for making a color adjustment of a print based on the identification information entered by the input device.

The image processing apparatus also includes a setter for setting colorimetric values of the designated color as a reference color. The image data generator generates image data of pixel values calculated such that the color patches are arranged in a two-dimensional pattern on the print medium around the reference color set by the setter, and color differences in an equal color space between adjacent ones of the color patches are represented by a substantially equal interval along a row or column of color patches.

With the above image processing apparatus, when the operator observes the color chart, the observer visually recognizes the colors of the color patches as they change at substantially equal intervals. If the designated color is a color outside of the gamut of the print, or falls within the gamut but is near the boundary thereof, then the operator is capable of intuitively grasping the tendency of the colors, and can adjust the designated color in a shorter period of time.

Preferably, the input device enters a judgement result as to whether or not the designated color is present within the range of the colors of the color patches of the printed color chart, and the setter resets the reference color based on the judgement result or the identification information, which is entered by the input device. If the designated color is outside of the gamut, or falls within the gamut but is near the boundary thereof, then it is possible to determine a next reference color, based on the judgement as to whether the designated color is present within the color chart or not, and hence the designated color can quickly be reached.

Preferably, the setter resets a color corresponding to the identification information as the reference color when the judgement result indicating that the designated color is present and the identification information are entered by the input device.

Preferably, the setter further sets an interval of the color differences, and resets the interval of the color differences as a smaller interval when the judgement result indicating that the designated color is present is entered by the input device. It is thus possible to further narrow down a retrieval range within a color range in which the designated color is confirmed as being present, thus increasing the color resolution of each color patch so as to adjust the designated color more accurately.

Preferably, the setter further resets the reference color or the interval of the color differences so that all of the pixel values of the color patches represented by the image data generated by the image data generator represent colors within the range of the gamut of the print. Since the colors of all of the color patches fall within the range of the gamut, and the number of selectable color patches is increased, the image processing apparatus operates efficiently.

Preferably, the image data generator generates image data including identification marks added to the color patches, when the colors in the equal color space, which correspond to the color patches, represent colors outside of the range of the gamut of the print.

Preferably, the image data generator generates image data including identification marks added to the color patches, when the colors in the equal color space, which correspond to the color patches, represent colors falling within the range of the gamut of the print and in the vicinity of the boundary of the gamut. With this arrangement, the operator is capable of easily recognizing whether each of the color patches belongs to the gamut or not, and that the designated color is a color in the vicinity of the boundary of the gamut.

Preferably, the image data generator corrects pixel values of the image data based on acquired colorimetric values of the color patches. With this arrangement, a shift between designed colorimetric values and measured colorimetric values of the color patches can be corrected, thus making it easy to locate the designated color on the color chart.

According to the present invention, there also is provided an image processing method of printing a color chart having a plurality of color patches of respective colors on a print medium, selecting one of the color patches from the color chart as having a color closest to a designated color, and making a color adjustment of a print based on identification information of the selected color patch, comprising the steps of setting colorimetric values of the designated color as a reference color, and generating image data of pixel values calculated such that the color patches are arranged in a two-dimensional pattern on the print medium around the set reference color, and color differences in an equal color space between adjacent ones of the color patches are represented by a substantially equal interval along a row or column of color patches.

According to the present invention, there is further provided a recording medium storing a program for enabling a computer to perform an image processing process to make a color adjustment of a print, such that the program further enables the computer to perform the functions of setting colorimetric values of a designated color as a reference color, generating image data of pixel values calculated such that a plurality of color patches are arranged in a two-dimensional pattern on a print medium around the set reference color, and color differences in an equal color space between adjacent ones of the color patches are represented by a substantially equal interval along a row or column of color patches, printing a color chart on the print medium based on the image data, and making a color adjustment of the print based on identification information of one of the color patches, which is selected from the color chart as having a color closest to the designated color.

With the above recording medium, when the operator observes the color chart, the observer visually recognizes colors of the color patches as they change at substantially equal intervals. If the designated color is a color outside of the gamut of the print, or falls within the gamut but is near the boundary thereof, then the operator is capable of intuitively grasping the tendency of the colors, and can adjust the designated color in a shorter period of time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a diagram showing a presentation area formed by the designated color adjusting color chart according to the embodiment;

DESCRIPTION OF THE PREFERRED EMBODIMENTS

An image processing method according to a preferred embodiment of the present invention in relation to an image processing apparatus, and a printing system for carrying out the image processing method, will be described in detail below with reference to the accompanying drawings.

Figure 1:
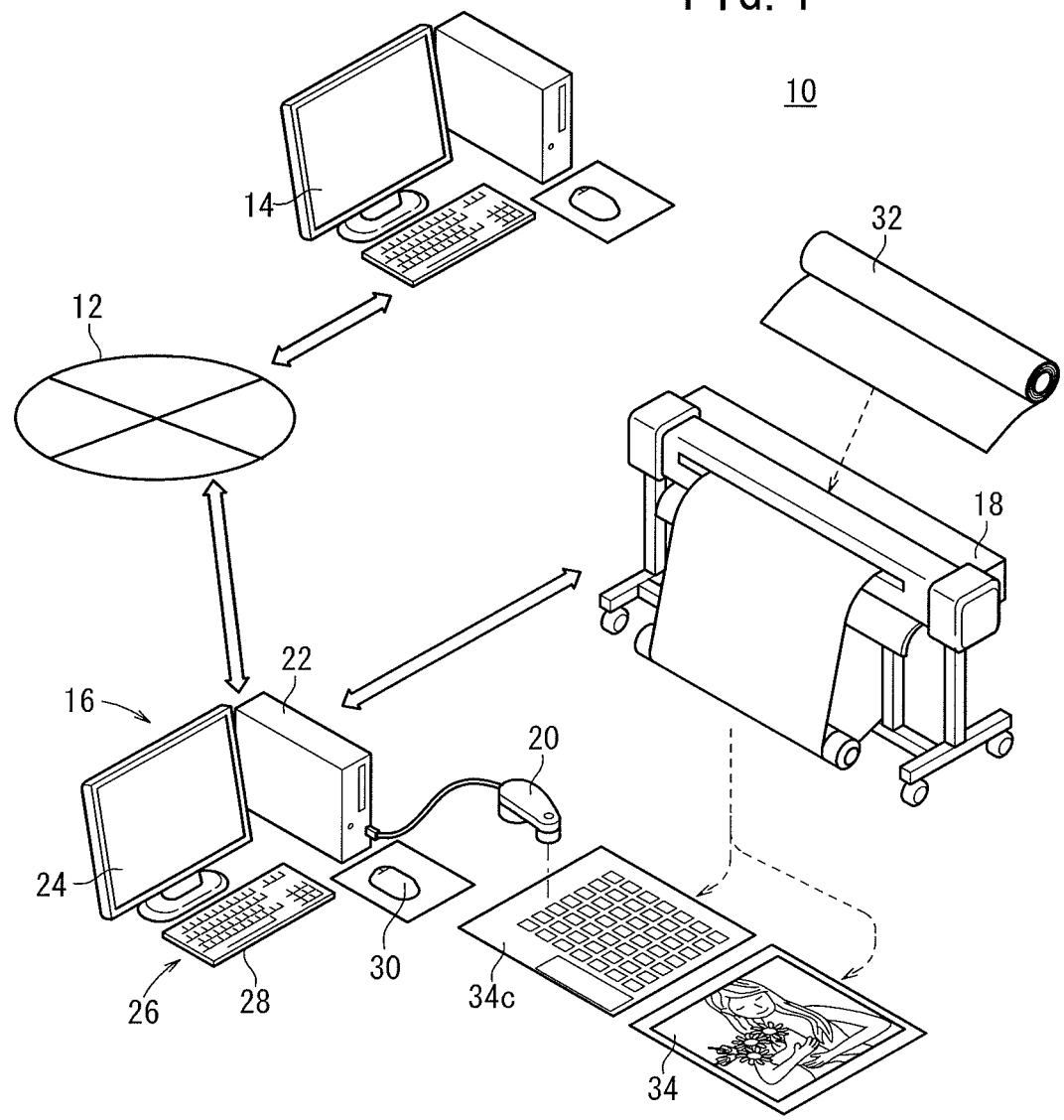
FIG. 1 is a perspective view of a printing system incorporating an image processing apparatus according to an embodiment of the present invention.

FIG. 1 shows in perspective a printing system 10 incorporating an image processing apparatus 16 according to an embodiment of the present invention.

As shown in FIG. 1, the printing system 10 basically comprises a LAN 12, an editing apparatus 14, an image processing apparatus 16, a printing machine 18, and a colorimeter 20.

The LAN 12 makes up a network constructed according to communication standards such as Ethernet (registered trademark) or the like. The editing apparatus 14 and the image processing apparatus 16 are connected to each other through the LAN 12 by a wired or a wireless link.

The editing apparatus 14 is capable of editing the arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems, and XPS (XML Paper Specification).

A color scanner, not shown, is connected to the editing apparatus 14. The color scanner is capable of optically reading a color original set in position. Therefore, the editing apparatus 14 can acquire color image data from the color scanner, based on the color original read thereby, as the image data of an electronic manuscript.

The image processing apparatus 16 converts the color image data of an electronic manuscript described by PDL and acquired from the editing apparatus 14 into bitmap image data (a type of raster image data), performs a desired image processing process, e.g., a color conversion process, an image scaling process, an image arranging process, etc., on the bitmap image data, converts the processed bitmap image data into a print signal that matches the printing process of the printing machine 18, and sends the print signal to the printing machine 18.

The image processing apparatus 16 comprises a main unit 22, including a CPU, a memory, etc., a display device 24 for displaying color images, and an input device 26 serving as an input unit and including a keyboard 28 and a mouse 30. The colorimeter 20 is connected to the main unit 22 of the image processing apparatus 16.

The printing machine 18 comprises an inkjet printing apparatus for producing a color image based on a combination of standard inks of colors C, M, Y, K (process colors), together with optional inks of light colors, such as LC, LM, etc., and W (white). The printing machine 18 controls the propulsion of inks onto a print medium 32 (rolled non-printed medium in FIG. 1), based on a print signal received from an external apparatus, e.g., the image processing apparatus 16, in order to print a color image on the print medium 32, thereby producing a print 34, which may include a designated color adjusting color chart 34c.

The print medium 32 may comprise a paper medium such as synthetic paper, thick paper, aluminum-evaporated paper, or the like, a resin medium such as vinyl chloride, PET, or the like, or tarpaulin paper, etc.

The colorimeter 20 measures colorimetric values of an object to be measured. Such colorimetric values refer not only to tristimulus values X, Y, Z and the coordinates L*, a*, b* of a uniform color space, etc., but also the characteristics of optical physical values with respect to wavelengths, e.g., a spectral radiance distribution, a spectral sensitivity distribution, a spectral reflectivity, or a spectral transmittance.

Figure 2A:
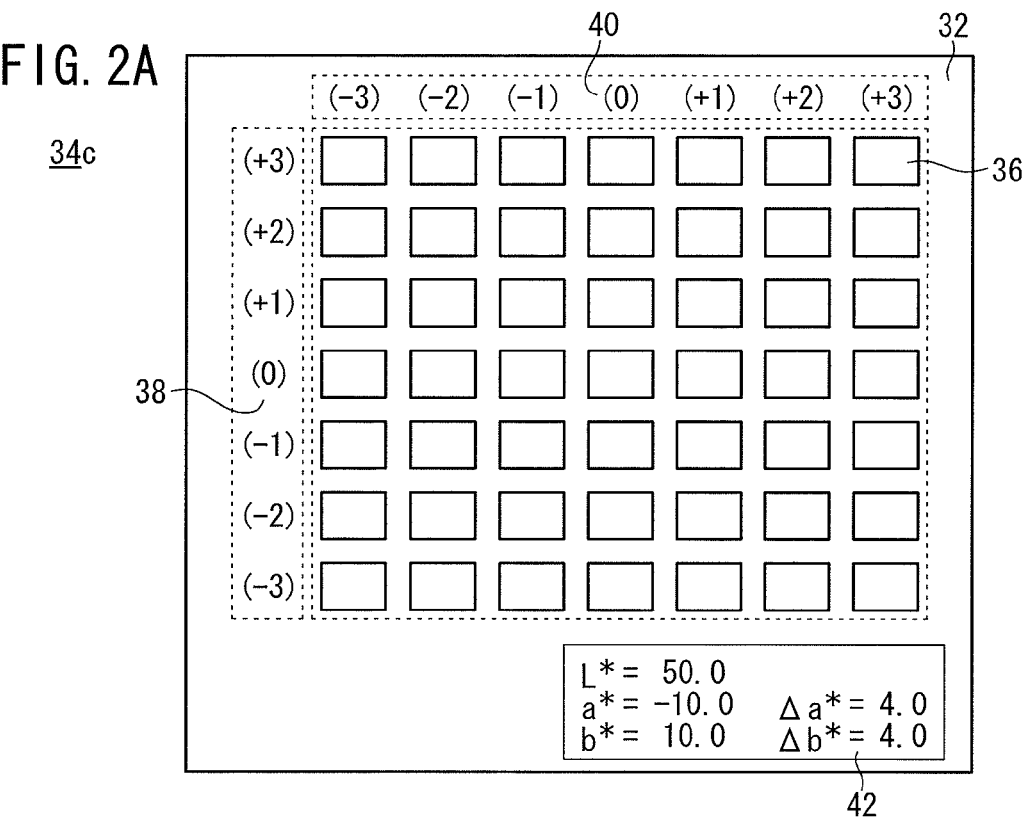
FIGS. 2A and 2B are front elevational views of designated color adjusting color charts according to the embodiment.
Figure 2B:
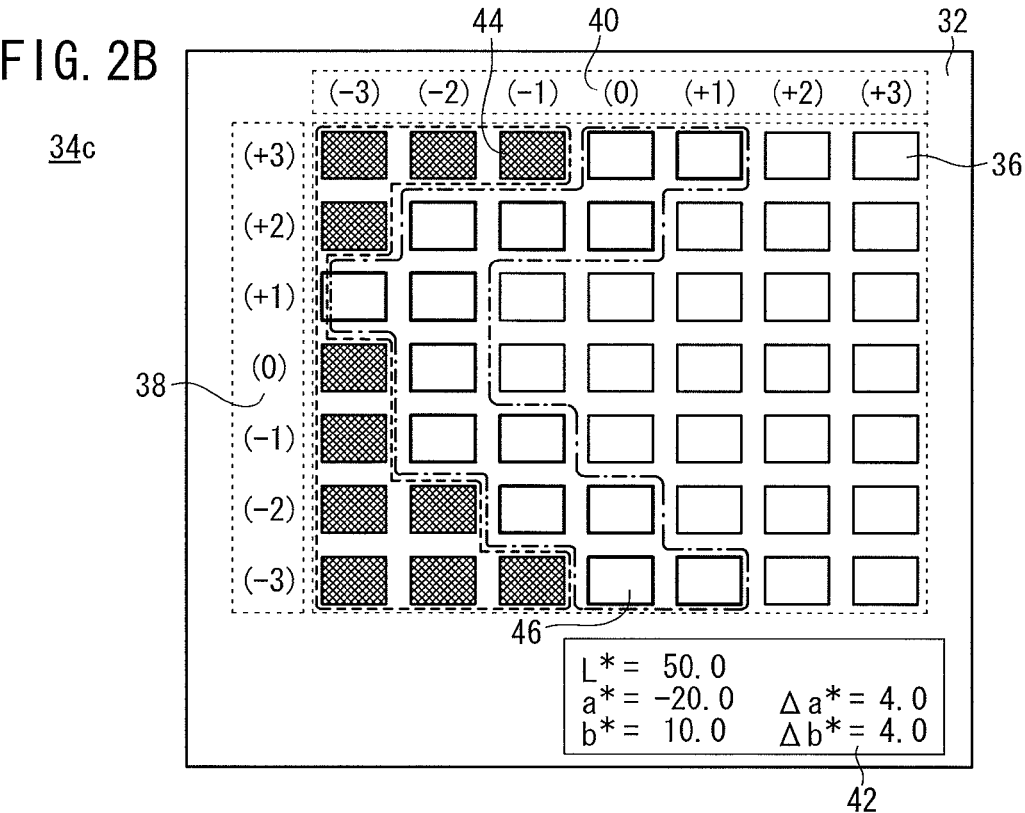

FIGS. 2A and 2B are front elevational views of designated color adjusting color charts 34c.

The designated color adjusting color chart 34c shown in FIG. 2A comprises 49 color patches 36 made up of different colors, which are substantially identical in shape, row numbers 38 and column numbers 40 for identifying the positions of the color patches 36 along the directions of rows and columns, and print information 42 for identifying conditions for printing the color chart 34c, all of which are printed on the print medium 32.

The color patches 36 are arranged in a matrix having 7 vertical columns and 7 horizontal rows, the color patches 36 being spaced from each other by given intervals. Colors of the respective color patches 36 are set to given values in a range of signal levels of C, M, Y, K values (a percentage range from 0% to 100% or an 8-bit gradation range from 0 to 255).

The row numbers 38, which serve as identification information, represent a vertical string of characters ranging from (+3) to (−3) positioned in alignment with and to the left of the respective rows of the color patches 36. The column numbers 40, which also serve as identification information, represent a horizontal string of characters ranging from (−3) to (+3) positioned in alignment with and at the top of the respective columns of the color patches 36.

The print information 42 is positioned in a lower portion of the color chart 34c, representing the values of L*, a*, b*, Δa*, and Δb*.

The designated color adjusting color chart 34c shown in FIG. 2B is similar in appearance to the color chart 34c shown in FIG. 2A, except that it includes 11 black patches 44, shown by cross-hatching, which replace the corresponding color patches 36 shown in FIG. 2A in a lefthand region of the color chart 34c, and also includes 14 thick-framed color patches 46, which replace the corresponding color patches 36 shown in FIG. 2A.

Figure 3:
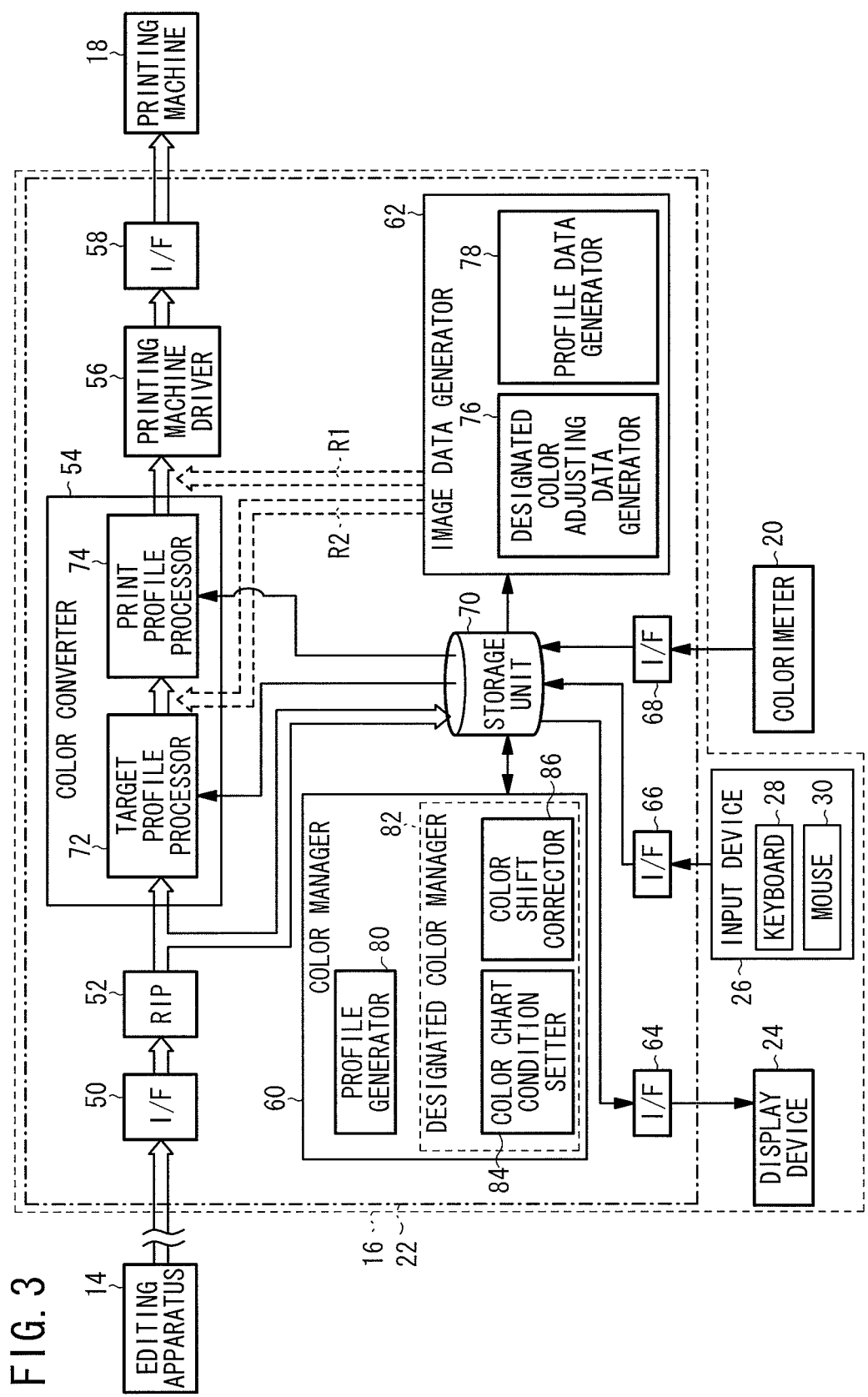
FIG. 3 is a functional block diagram of the image processing apparatus according to the embodiment.

FIG. 3 is a functional block diagram of the image processing apparatus 16 according to the present embodiment. In FIG. 3, an electronic manuscript is supplied along directions indicated by the outlined solid-line arrows, color-chart image data is supplied along directions indicated by the outlined broken-line arrows, and various other data is supplied along directions indicated by the solid-line arrows.

As shown in FIG. 3, the main unit 22 of the image processing apparatus 16 includes an I/F 50 for entering an electronic manuscript supplied from the editing apparatus 14, a RIP (Raster Imaging Processor) 52 for converting the PDL format of the electronic manuscript supplied from the I/F 50 into a bitmap format, a color converter 54 for performing a color converting process on the converted C, M, Y, K values (or R, G, B values) of the electronic manuscript from the RIP 52 in order to produce image data made up of new C, M, Y, K values, a printing machine driver 56 for converting the image data of the new C, M, Y, K values produced by the color converter 54 into a print signal (ink propulsion control data) that matches the printing process of the printing machine 18, and an I/F 58 for outputting the print signal generated by the printing machine driver 56 to the printing machine 18.

The main unit 22 also includes a color manager 60 for managing profiles of different printing machines 18, an image data generator 62 for generating image data to print the designated color adjusting color chart 34c or a profile color chart, not shown, an I/F 64 connected to the display device 24, an I/F 66 connected to the input device 26 including the keyboard 28 and the mouse 30, and an I/F 68 connected to the colorimeter 20.

The main unit 22 also includes a storage unit 70 for storing various data supplied from various components of the main unit 22, and for supplying stored data to various components of the main unit 22. The storage unit 70 is connected to the RIP 52, the color converter 54, the color manager 60, the image data generator 62, the I/F 64, the I/F 66, and the I/F 68.

The color converter 54 comprises a target profile processor 72 for converting device-dependent data into device-independent data, and a print profile processor 74 for converting device-independent data into device-dependent data. Device-dependent data refer to data defined in terms of C, M, Y, K values, R, G, B values, or the like, for appropriately driving various devices. Device-independent data refer to data defined in terms of a display system, such as an HSL system, an HSB system, a CIELAB coordinate system, a CIELUV coordinate system, an XYZ system, or the like.

The image data generator 62 comprises a designated color adjusting data generator 76 for generating image data to print the designated color adjusting color chart 34c, and a profile data generator 78 for generating image data to print the profile color chart.

The color manager 60 comprises a profile generator 80 for generating profiles for respective printing machines 18, and a designated color manager 82 for managing designated colors for the respective printing machines 18. The designated color manager 82 comprises a color chart condition setter (setter) 84 for setting color chart conditions (reference colors, color difference intervals), to be described later, and a color shift corrector 86 for correcting shifts in the colorimetric values.

The RIP 52 can perform various image processing processes including an image scaling process depending on the resolution, etc., of the printing machine 18, and a rotating and inverting process depending on a printing format when an electronic manuscript is converted into bitmap image data.

The printing machine driver 56 generates ink propulsion control data corresponding to ink colors (C, M, Y, K, LC, LM, or W) from C, M, Y, K values. The ink propulsion control data are related to operational details of the printing machine 18, which ejects inks (ink ejection ON/OFF, ink dot diameters, etc.) according to data definitions inherent in the printing machine 18. The printing machine driver 56 may generate the ink propulsion control data according to a known algorithm, such as a dither matrix method, an error diffusion method, or the like, although it requires conversion from an 8-bit multiple-gradation image into a low-gradation image such as a binary image.

The target profile processor 72 or the print profile processor 74 is capable of correcting profiles depending on a print mode of the printing machine 18. The print mode refers to various print settings, such as the number of nozzles of the print head, the timing (unidirectional/bidirectional) of ink ejection during scanning of the print head, the number of passes, the number and type of inks used on the printing machine 18, the algorithm for generating ink ejection control data, etc.

The main unit 22 has a controller (not shown) comprising a CPU, etc., for controlling all of the image processing processes described above. More specifically, the controller controls not only operations of various components of the main unit 22, e.g., reading data from and writing data to the storage unit 70, but also transmission of display signals via the I/F 64 to the display device 24, and acquisition of colorimetric data from the colorimeter 20 via the I/F 68.

The image processing apparatus 16 according to the present embodiment is constructed basically as described above. The image processing processes or functions described above can be performed according to application programs stored in the storage unit 70, which operate according to a basic program (operating system).

Figure 4:
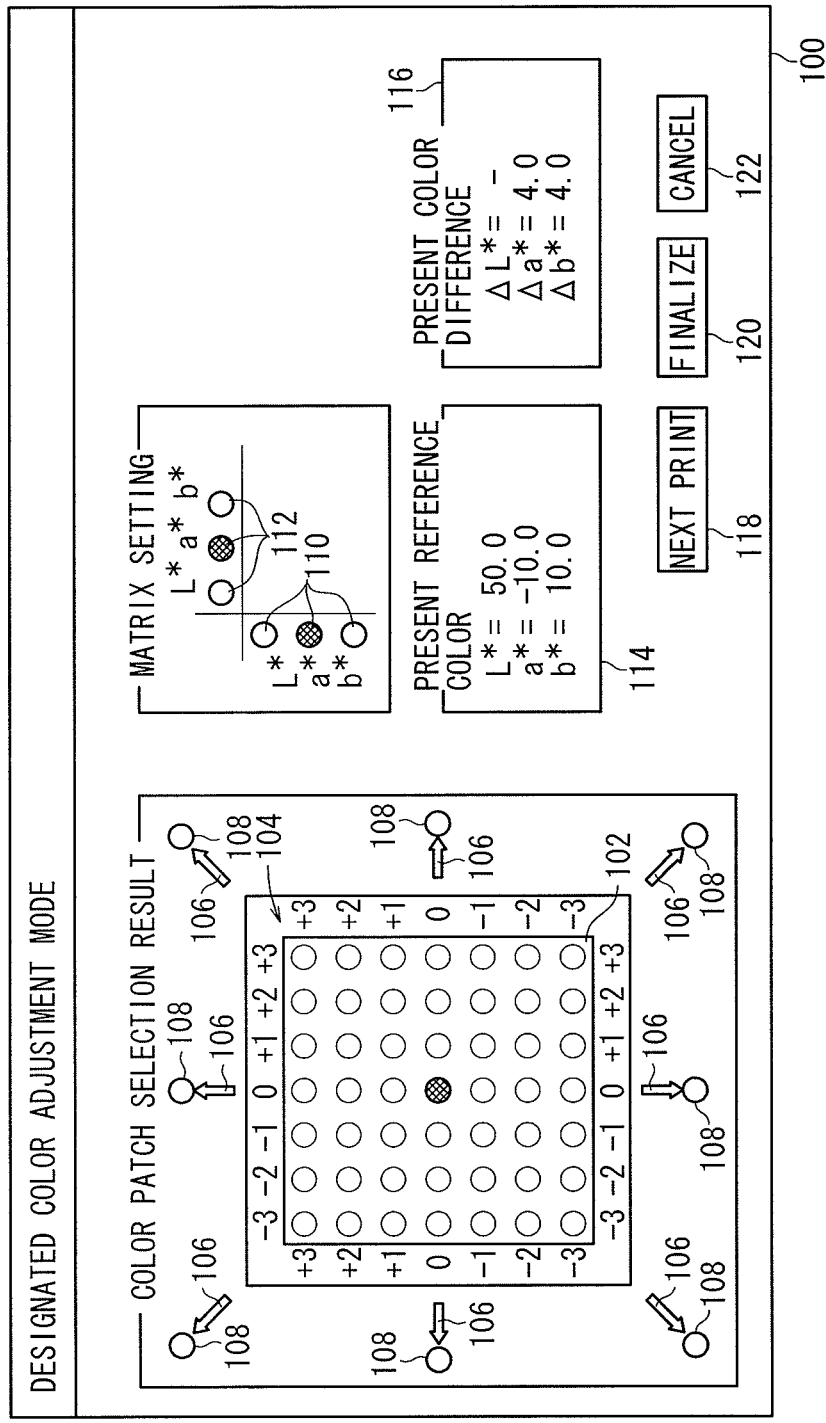
FIG. 4 is a view showing, by way of example, a setting image for adjusting a designated color according to the embodiment.

FIG. 4 shows by way of example a setting image 100 for adjusting a designated color according to the present embodiment.

The setting image 100, which is displayed on the display device 24, includes in a lefthand area thereof a two-dimensional matrix of 49 radio buttons 102, a numeral string 104 disposed around the radio buttons 102, 8 arrows 106 disposed around the numeral string 104, and 8 radio buttons 108 disposed at respective tip ends of the arrows 106.

The setting image 100 includes in an upper righthand area thereof a vertical array of 3 radio buttons 110, and a horizontal array of 3 radio buttons 112. The radio buttons 110 in the vertical array are associated with respective letters L*, a*, b* disposed to the left of the radio buttons 110. The radio buttons 112 in the horizontal array are associated with respective letters L*, a*, b* disposed above the radio buttons 112.

The setting image 100 includes in a central righthand area thereof two (i.e., left and right) display windows 114, 116. The display window 114 displays colorimetric values L*, a*, b*, while the display window 116 displays colorimetric values ΔL*, Δa*, Δb*.

The setting image 100 includes in a lower righthand area thereof buttons 118, 120, 122 displaying "NEXT PRINT", "FINALIZE", and "CANCEL", respectively, successively from left to right.

The printing system 10 basically is constructed as described above. Operations of the printing system 10 will be described below, mainly with reference to the flowchart shown in FIG. 5 and FIG. 1.

An operator examines printing conditions and observational manners of a print 34 to be produced (step S1). Printing conditions refer to the type of the printing machine 18 that is used to produce the print 34. Observational manners refer to the type of observational light source used for the print 34, and the manner in which the print 34 is presented (i.e., as a reflection, transmission, or combination thereof).

Then, the operator selects a profile suitable for the printing machine 18 (step S2). Normally, a target profile or a print profile is stored in the storage unit 70. If a profile suitable for the printing machine 18 is not registered, i.e., is not stored in the storage unit 70, then a print profile can be generated separately.

Then, an electronic manuscript is printed using the printing machine 18, thereby producing a color print 34 (step S3). The print 34 may be laminated by a laminating apparatus, not shown, in order to provide a protective film over the image surface of the print 34. The color image of the print 34 can thus be protected so as to provide better abrasion resistance and toughness.

Then, the operator evaluates the color of the image of the print 34 (step S4), and determines whether or not the color of the image is appropriate (step S5). The operator may evaluate the color of the image so as to determine whether desired hues are obtained or not, either by visually checking the image based on the observation of an overall or partial appearance of the image, or by obtaining a colorimetric value of a certain area of the print 34 with the colorimeter 20, and thereby determining whether or not the obtained colorimetric value falls within a desired range.

According to the present embodiment, a designated color (a real color sample) is provided for a certain area of the color image, and the operator evaluates the color of the image by determining whether or not the color of the certain area of the color image essentially is the same as the designated color.

If, as a result of such image evaluation, the operator judges that the image of the print 34 is not suitable, then the operator changes the profile in order to make fine adjustments of the color of the image (step S6). More specifically, the operator may reset or regenerate the profile, or the operator may make fine adjustments of the profile in order to correct the presently set profile.

Thereafter, an electronic manuscript is printed, and the color of the image thereof is evaluated repeatedly (steps S3 through S6) until a print 34 of desired color is obtained.

An image processing sequence of the image processing apparatus 16 for generating a profile (step S2) will be described in detail below with reference to FIG. 3.

Image data generated by the profile data generator 78 based on given C, M, Y, K value data stored in the storage unit 70 are supplied from the image data generator 62 via a path R1 to the printing machine driver 56, from which the image data are supplied to the printing machine 18 in the same manner as during printing of an electronic manuscript. Color patches of a profile color chart thus produced, not shown, are measured by the colorimeter 20, which is connected to the image processing apparatus 16, thereby producing colorimetric values L*, a*, b*. The colorimetric value data thus produced are temporarily stored in the storage unit 70. Thereafter, based on the associative relationship between the designated C, M, Y, K value data and the produced colorimetric values L*, a*, b*, a print profile is generated, which includes data representing a three-dimensional to four-dimensional conversion LUT.

An image processing sequence of the image processing apparatus 16 for printing an electronic manuscript (step S3) will be described in detail below with reference to FIG. 3.

When an electronic manuscript in PDL format supplied from the editing apparatus 14 is input to the image processing apparatus 16 via the LAN 12 and the I/F 50, the electronic manuscript is converted into 8-bit C, M, Y, K bitmap data (device-dependent image data) by the RIP 52. The 8-bit C, M, Y, K bitmap data then are converted into L*, a*, b* data (device-independent image data) by the target profile processor 72. The L*, a*, b* data then are converted into C, M, Y, K value data (device-dependent image data) by the print profile processor 74. The C, M, Y, K value data then are converted into a print signal (ink ejection control data) by the printing machine driver 56. The print signal is supplied from the printing machine driver 56 via the I/F 58 to the printing machine 18. Thereafter, the printing machine 18 produces a desired print 34 based on the print signal.

Since target profiles and print profiles corresponding to a plurality of set conditions have been stored in the storage unit 70, a target profile and a print profile are selectively supplied to the target profile processor 72 and the print profile processor 74, depending on various preset conditions. If the profiles are appropriately corrected in view of the print mode of the printing machine 18, then a more appropriate color conversion process can be performed.

Figure 5:
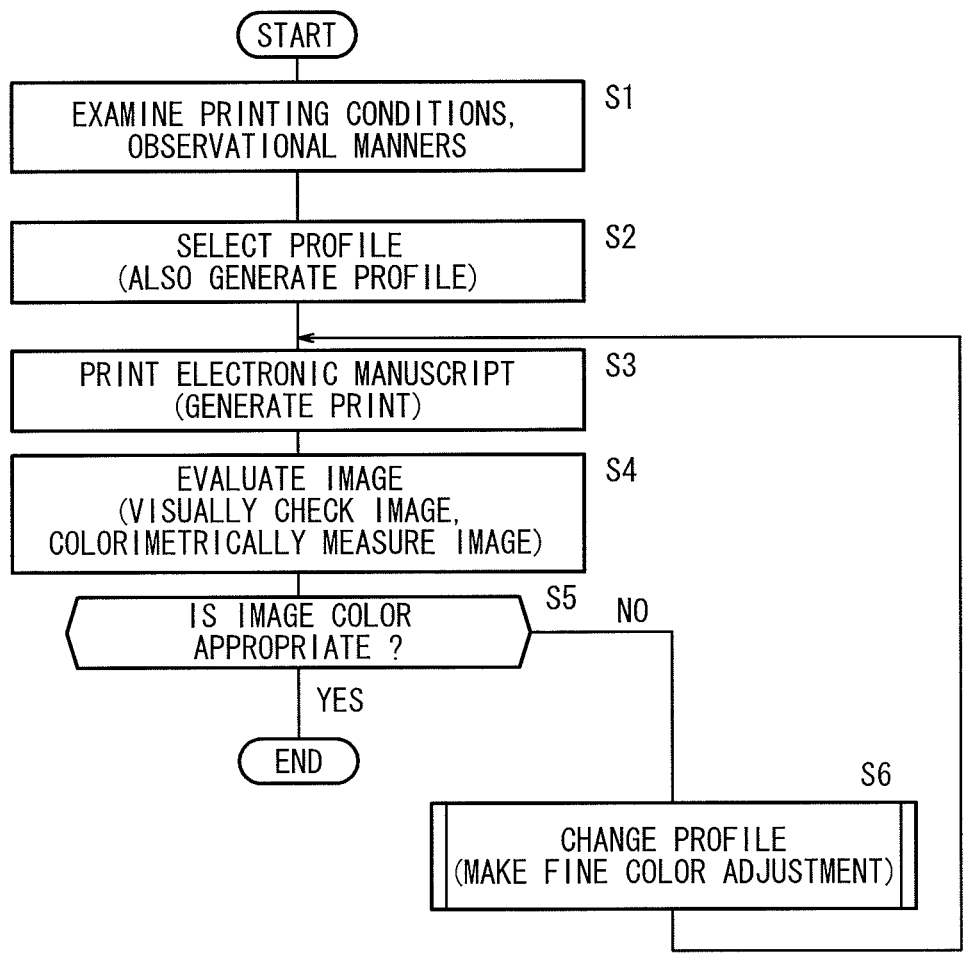
FIG. 5 is a flowchart of a sequence for producing an appropriate print with the printing system according to the embodiment.

The flowchart shown in FIG. 5, which describes a procedure for producing an appropriate print 34 with the printing system 10 according to the present embodiment, has been described above. Next, a process of changing the profile will be described in detail below.

Figure 6:
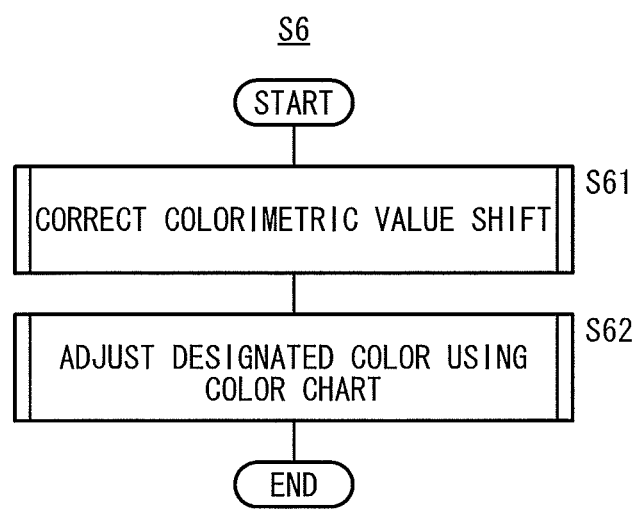
FIG. 6 is a flowchart of a profile changing process according to the embodiment.

The profile is changed (see step S6 in FIG. 5) according to the flowchart shown in FIG. 6. Specifically, the profile is changed by correcting a shift in the colorimetric value (step S61), and then adjusting a designated color using the designated color adjusting color chart 34c (step S62). Step 61 is a step of correcting in advance a slight shift in the print color, which is caused even when an appropriate profile, which has already been generated, is used.

Figure 7:
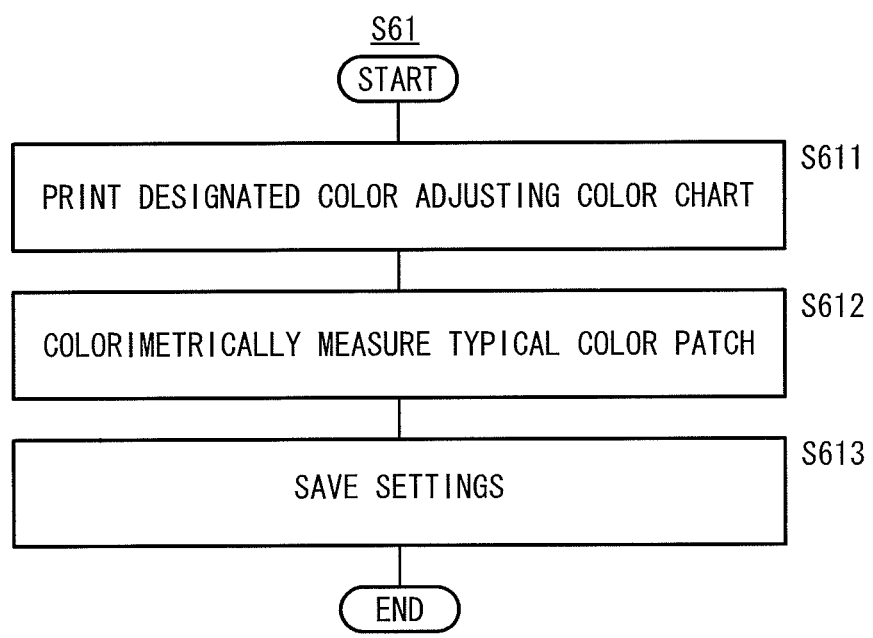
FIG. 7 is a flowchart of a process for correcting a shift of a colorimetric value according to the embodiment.

First, a process for correcting a shift in a colorimetric value (step S61) will be described below with reference to the flowchart shown in FIG. 7.

The designated color adjusting color chart 34c shown in FIG. 2A is printed (step S611). At this time, image data are generated by the designated color adjusting data generator 76 (see FIG. 3) of the image data generator 62. According to one process of determining colors, for placing a plurality of color patches 36 of different colors in a two-dimensional pattern, one (e.g., L*) of three variables (L*, a*, b*) of the uniform color space CIELAB is fixed, while the other two variables (e.g., a*, b*) are gradually changed at each of the positions of the color patches 36. More specifically, pixel values corresponding to the respective color patches 36 may be determined according to the following equations (1) through (3):

$$L^*_i = L^*_0 + \Delta L^* \times i (i = -3, -2, \ldots, +2, +3) \quad (1)$$

$$a^*_j = a^*_0 + \Delta a^* \times j (j = -3, -2, \ldots, +2, +3) \quad (2)$$

$$b^*_k = b^*_0 + \Delta b^* \times k (k = -3, -2, \ldots, +2, +3) \quad (3)$$

Hereinafter, a color represented by $(L^*_0, a^*_0, b^*_0)$ shall be referred to as a reference color, and $(\Delta L^*, \Delta a^*, \Delta b^*)$ shall be referred to as a color difference interval.

Furthermore, a color area formed by the color patches 36 of the designated color adjusting color chart 34c shall be referred to as a presentation area.

FIG. 8 is a diagram showing a presentation area 201 of the designated color adjusting color chart 34c according to the present embodiment. A hexagonal area formed in the a*-b* plane, with L* being fixed, represents a gamut 200 of the printing machine 18. If colors of the color patches 36 are plotted according to the above equations (2) and (3), for example, then the plotted points are disposed at equal intervals. At this time, the presentation area 201 corresponds to a rectangular area formed by four points ($a^*_0+3\Delta a^*$, $b^*_0+3\Delta b^*$), ($a^*_0+3\Delta a^*$, $b^*_0-3\Delta b^*$), ($a^*_0-3\Delta a^*$, $b^*_0+3\Delta b^*$), ($a^*_0-3\Delta a^*$, $b^*_0-3\Delta b^*$).

The presentation area 201 is not limited to being of a rectangular shape, but may be of a rhombic shape. Moreover, the presentation area 201 is not required to be parallel to a plane (L*-a* plane, a*-b* plane, or L*-b* plane) formed by the equal color space at all times. Rather, the three variables may be changed gradually at each of the positions of the color patches 36.

Image data are generated such that the color patch 36 of the reference color is disposed at the central position of the color patches 36, i.e., at a position where the row number is (0) and the column number is (0) in FIG. 2A, and such that the color differences between adjacent ones of the color patches 36 in one row or one column are substantially equal.

Data preset by the color chart condition setter 84 and stored in the storage unit 70 may be read and used as the reference color and the color difference interval.

Image data generated by the designated color adjusting data generator 76 are supplied from the image data generator 62 via a path R2 to the print profile processor 74. The image data are supplied from the print profile processor 74 to the printing machine 18, in the same manner as when an electronic manuscript is printed. Color patches 36 of the designated color adjusting color chart 34c (see FIG. 2A) substantially reproduce the preset color (L*, a*, b*).

Then, a typical color patch of the printed designated color adjusting color chart 34c is selected and measured by the colorimeter 20 (step S612). For example, the colorimeter 20 produces measured values (L*(meas), a*(meas), b*(meas)) of the selected color patch 36, the color of which has designed values (L*(des), a*(des), b*(des)).

Figure 9A:
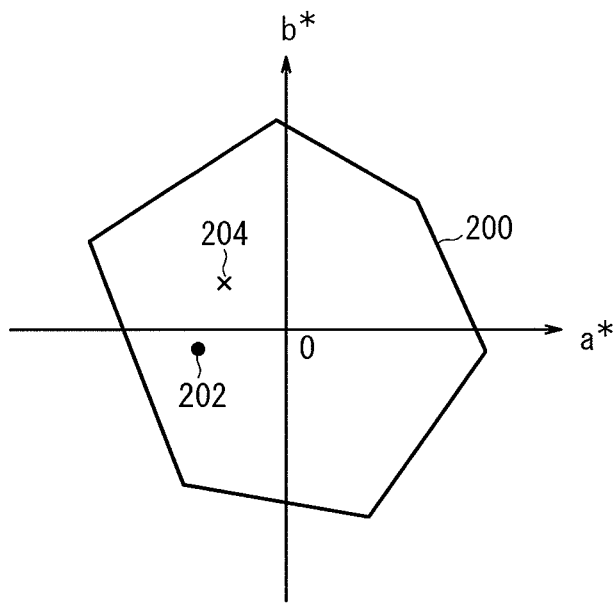
FIGS. 9A and 9B are diagrams showing a positional relationship between a reference color and a presentation area, before and after a colorimetric value is corrected.

For example, as shown in FIG. 9A, it is assumed that a reference color 204 (measured values) is obtained with respect to a reference color 202 (designed values) within the gamut 200 of the printing machine 18.

Then, the operator saves settings concerning the measured results on a setting image, not shown, displayed by the display device 24 (step S613). The color shift corrector 86 calculates correctives based on the colorimetric values designed (designated) as the pixel values of the image data and the colorimetric values actually produced by the colorimeter 20. For example, the color shift corrector 86 calculates correctives L*(diff), a*(diff), b*(diff) according to the following equations (4) through (6):

$$L^*(\text{diff}) = L^*(\text{meas}) - L^*(\text{des}) \quad (4)$$

$$a^*(\text{diff}) = a^*(\text{meas}) - a^*(\text{des}) \quad (5)$$

$$b^*(\text{diff}) = b^*(\text{meas}) - b^*(\text{des}) \quad (6)$$

When the image data are generated, the correctives L*(diff), a*(diff), b*(diff) are added to the designed values of the colors, for thereby correcting a slight shift in the print color in order to achieve an increase in color reproduction accuracy.

Figure 9B:
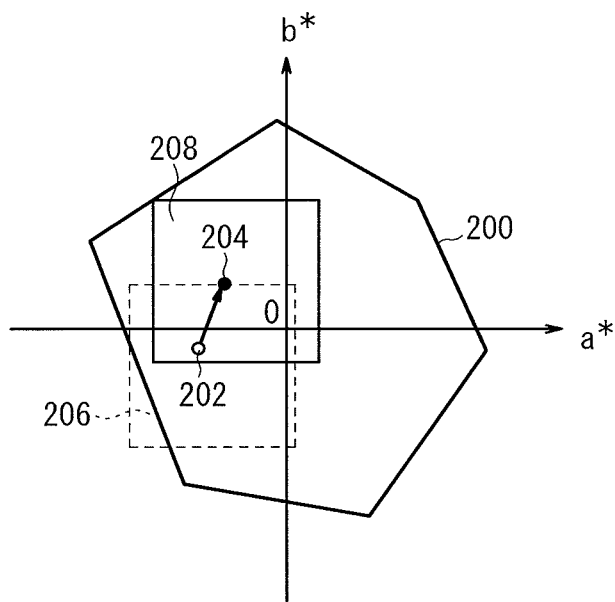

More specifically, as shown in FIG. 9B, if a shift in the colorimetric values of the print 34 is not corrected, then a presentation area (designed values) 206 indicated by the broken lines and a presentation area (measured values) 208 indicated by the solid lines are different from each other, thus making it difficult to adjust a designated color (step S62), to be described later. However, when the shift is corrected as described above, the presentation area 206 and the presentation area 208 are brought into conformity with each other, thereby making it possible to adjust a designated color as desired.

The correctives L*(diff), a*(diff), b*(diff) are temporarily managed by the color shift corrector 86 of the designated color manager 82, and are taken into account at times when the profile is changed. In this manner, a shift in the colorimetric values of the print 34 is corrected.

Figure 10:
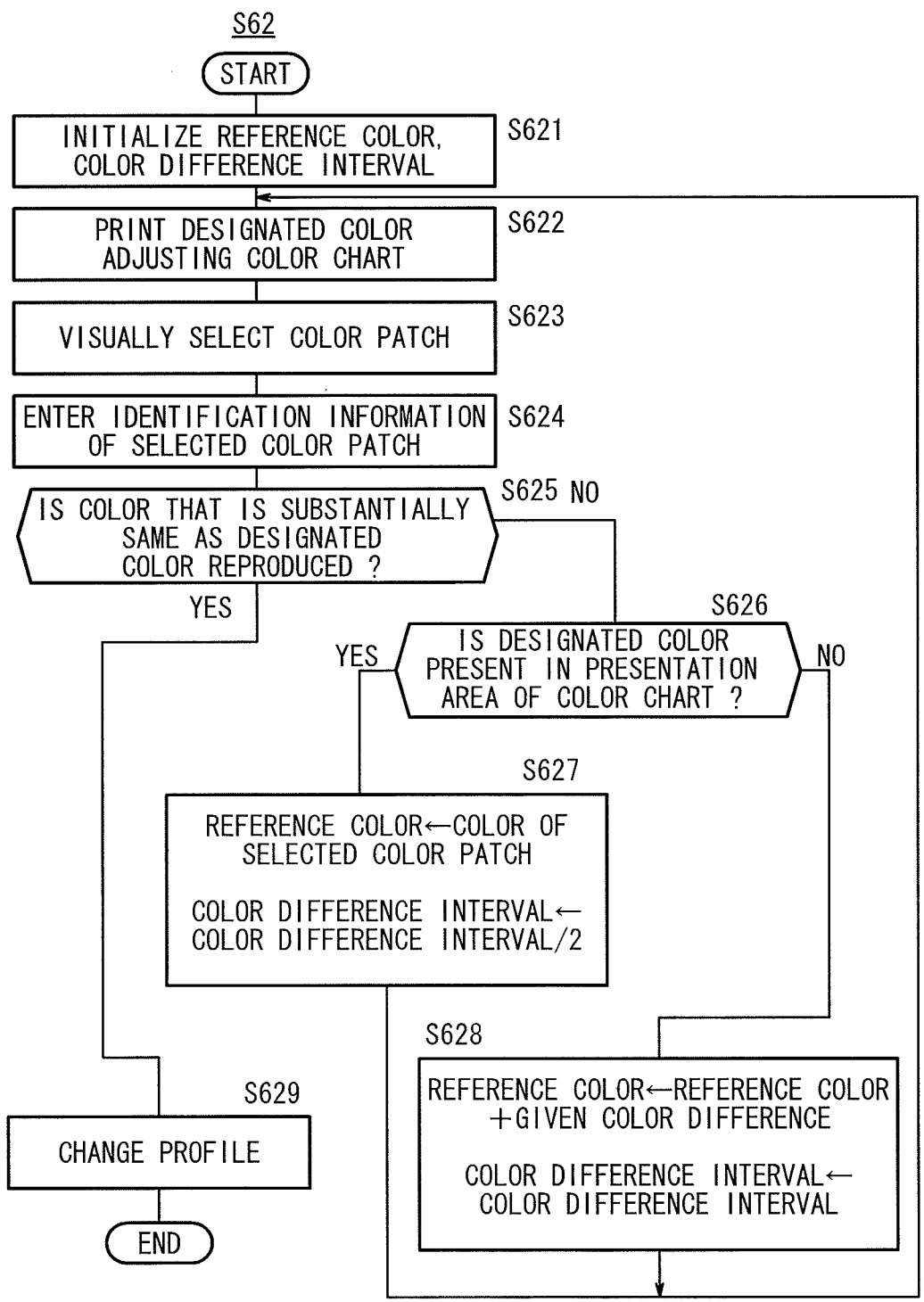
FIG. 10 is a flowchart of a process for adjusting a designated color using the designated color adjusting color chart according to the embodiment.

Secondly, a process for adjusting a designated color using the designated color adjusting color chart 34c (step S62) shall be described below with reference to the flowchart shown in FIG. 10.

The reference color and the color difference interval of the designated color adjusting color chart 34c are initialized (step S621). These values can freely be set by the color chart condition setter 84 (see FIG. 3).

For example, colorimetric values corresponding to the color number of a color sample of color chips or the like may be acquired and used as initial values of the reference color ($L^*_0$, $a^*_0$, $b^*_0$). The colorimetric values may be acquired by measuring the actual color sample with the colorimeter 20. Alternatively, colorimetric values associated with color numbers may be stored in advance in the storage unit 70, and may be called each time that the reference color is initialized. The reference color and the color difference interval may be initialized by selecting values with a GUI controller, such as a color wheel.

The color difference interval ($\Delta L^*$, $\Delta a^*$, $\Delta b^*$) may be initialized to appropriate values, which have been empirically established in color adjustment operations.

Then, the designated color adjusting color chart 34c is printed (step S622). Printing of the designated color adjusting color chart 34c will not be described below, as it has already been described (see step S611 shown in FIG. 7).

As shown in FIG. 4, the reference color of the designated color adjusting color chart 34c is displayed in the display window 114, and the color difference interval is displayed in the display window 116. Therefore, such displayed values can easily be referred to.

Color patches 36 disposed in the two-dimensional array on the designated color adjusting color chart 34c are set such that a* and b* are changed, respectively, vertically and horizontally at the color difference interval ($\Delta a^*$, $\Delta b^*$). Settings of the row or column variables (two of L*, a*, b*) may be changed by pressing the radio buttons 110, 112.

Then, the operator selects one of the color patches 36 of the designated color adjusting color chart 34c (step S623). More specifically, the operator visually compares a color sample representing a designated color serving as a target represented by a color chip, or a color displayed by the display device 24, with the designated color adjusting color chart 34c, and selects one of the color patches 36, the color of which is closest to the designated color.

Since, when the operator visually observes the designated color adjusting color chart 34c, the operator visually recognizes colors of the color patches 36 as they change at substantially equal intervals, the operator can easily select a color patch 36, the color of which is closest to the designated color. Particularly, if the designated color is a color outside of the gamut 200, or falls within the gamut 200 but is near the boundary thereof, then the operator does not need to take time in selecting a color patch 36.

If a color patch 36, the color of which is essentially the same as the designated color, is not present within the presentation area 201 of the designated color adjusting color chart 34c, then the operator takes into account the tendency of the array of colors of the color patches 36, and estimates the direction in which the designated color is likely to be present, among eight directions (upper, lower, left, right, and oblique at 45 degrees) outside of the presentation area 201.

Then, the operator enters identification information of the selected color patch 36 (step S624). More specifically, the operator presses one of the radio buttons 102 (see FIG. 4) at a position aligned with numerals (see FIG. 2A) represented by one of the row numbers 38 and one of the column numbers 40, which correspond to the selected color patch 36 along the numeral string 104 in the setting image 100 shown in FIG. 4. If it is assumed that the designated color is not present within the presentation area 201 of the color patches 36, then the operator selects one of the arrows 106, which represents one of eight directions in the equal color space, and presses the radio button 108 at the tip end of the selected arrow 106.

The radio buttons are exclusive buttons. Therefore, only one out of the total of 57 radio buttons, including the 49 radio buttons 102 and the 8 radio buttons 108, may be selected. The operator can thus enter simultaneously a judgement as to whether or not there is a color that is substantially the same as the designated color, and an identification number (selected number) of the selected color patch 36, when there is a color that is substantially the same as the designated color.

By displaying, together with the arrows 106, the tendency of color changes outside of the presentation area 201 in the vicinity of the arrows 106, it is possible for the operator to select the designated color with ease, even if the operator is unaware of the definition of the coordinates of the equal color space (i.e., a corresponding relationship between the $L^*$, $a^*$, $b^*$ values and the colors).

Then, the operator determines whether a color that is substantially the same as the designated color has been reproduced by the selected color patch 36 (step S625). If the operator judges that a color substantially the same as the designated color has not been reproduced, but there is still a possibility of such a selection, then the operator presses the "NEXT PRINT" button 118. The image processing apparatus 16 performs an internal processing operation to automatically set the next reference color and color difference interval (steps S626 through S628).

Setting of a next reference color and presentation area, in the event there is a color closest to the presentation area 201 of the designated color adjusting color chart 34c (a color substantially the same as the designated color) (step S627), will be described below with reference to FIGS. 11A and 11B.

It is assumed that, as a result of visual observation of the designated color adjusting color chart 34c having a reference color set to ($L^*$=50.0, $a^*$=−10.0, $b^*$=10.0) and a color difference interval to ($\Delta a^*$=4.0, $\Delta b^*$=4.0), a color patch 36 having a row number 38 of (−1) and a column number 40 of (−2) is selected.

Figure 11A:
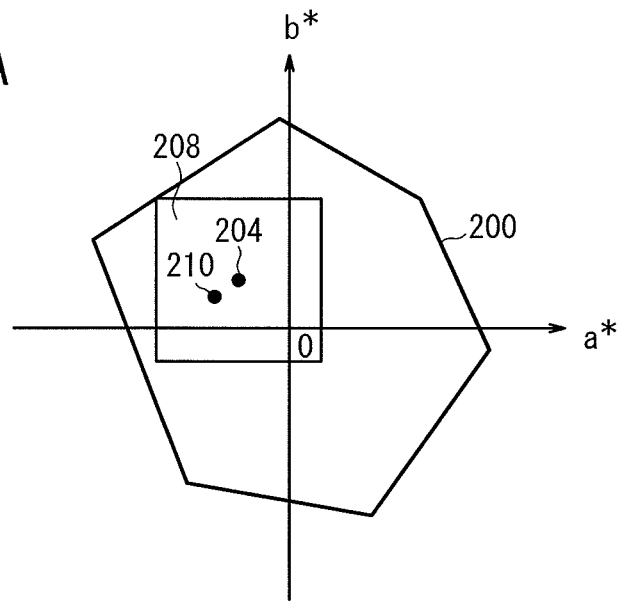
FIGS. 11A and 11B are diagrams showing setting of a next reference color and a presentation area, if a designated color is present within the presentation area of the color chart.
Figure 11B:
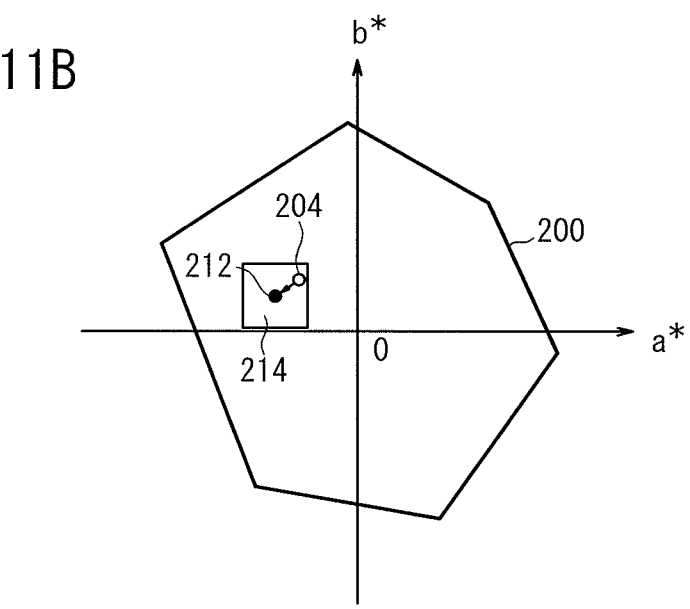

At this time, as shown in FIG. 11A, a substantially square presentation area 208 is formed with a reference color 204 at the center thereof. Also, a selected color 210 is present within the presentation area 208 (leftwardly of and below the reference color 204).

If the color adjusting process is continued, then the selected color 210 ($L^*$=50.0, $a^*$=−18.0, $b^*$=6.0) is set as a next reference color 212. A smaller color difference interval (e.g., one-half) ($\Delta a^*$=2.0, $\Delta b^*$=2.0) is set as a next color difference interval. An area of the next presentation area 214 is set to ¼ of the previous presentation area 208.

Thus, by narrowing down the color retrieval range, it is possible to increase color resolution, and thus make it possible to adjust the designated color accurately and efficiently.

Setting of a next reference color and presentation area, in the event there is not a color closest to the presentation area 201 of the designated color adjusting color chart 34c (a color substantially the same as the designated color) (step S628), will be described below with reference to FIGS. 12A and 12B.

It is assumed that, as a result of a visual observation of the designated color adjusting color chart 34c having a reference color set to ($L^*$=50.0, $a^*$=−10.0, $b^*$=10.0) and a color difference interval set to ($\Delta a^*$=4.0, $\Delta b^*$=4.0), no color patch 36 is selected. However, a color patch is expected to be present to the left of the designated color adjusting color chart 34c (in a negative direction of $a^*$).

Figure 12A:
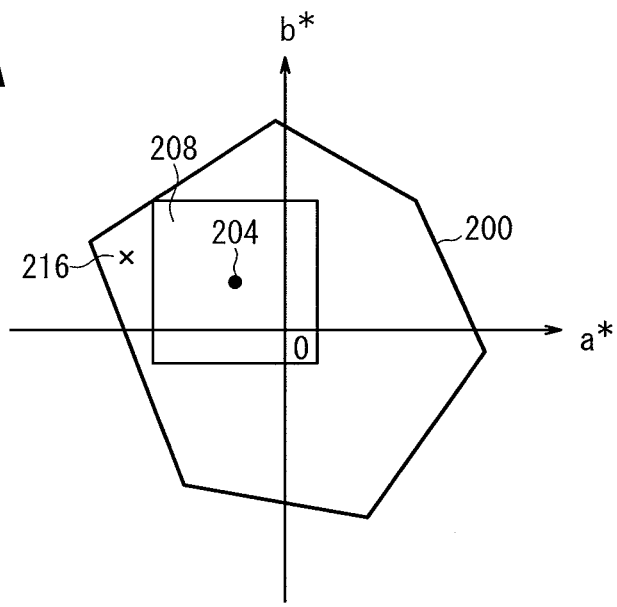
FIGS. 12A and 12B are diagrams showing setting of a next reference color and a presentation area, if a designated color is not present within the presentation area of the color chart.

At this time, as shown in FIG. 12A, a substantially square presentation area 208 with a reference color 204 at the center thereof is formed, and an estimated position 216 of the designated color is present outside of the presentation area 208 (leftwardly of the reference color 204).

If the color adjusting process is continued, then a color ($L^*$=50.0, $a^*$=−20.0, $b^*$=10.0), which has been displaced from the reference color 204 by a given value (for example, 10) in a direction selected by a radio button 108 (in a negative direction of $a^*$), is set as a next reference color 212. A color difference interval ($\Delta a^*$=4.0, $\Delta b^*$=4.0), which is the same as the previous color difference interval, is set as a next color difference interval. The area of the next presentation area 214 is set to the area of the previous presentation area 208.

When a color patch 36 is printed, which has a color that is present in an area that is not color-reproducible, such as a color outside of the gamut 200, or in an area which is strongly nonlinear and has low color reproduction accuracy, such as a color in the vicinity of the gamut 200, the color patch 36 should preferably be assigned an identification mark, which acts to call the attention of the operator. The identification mark may be in the form of a mark, which is applied near the color patch 36, or may be a deformation of the color patch 36 itself.

Figure 12B:
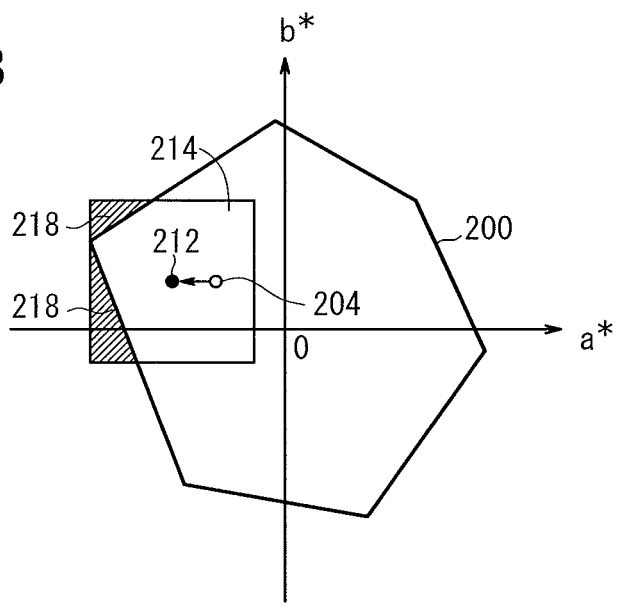

For example, as shown in FIG. 12B, if the color ($L^*$, $a^*$, $b^*$) calculated according to equations (1) through (3) is outside of the gamut 200 or resides within an outside-gamut area 218, then it is preferable that the pixel value of the color patch 36, which corresponds to the color, be rewritten, and that a black patch 44 be printed (see FIG. 2B). The operator can thus recognize that the black patch 44 is excluded from selectable candidates.

As shown in FIG. 12B, if a color within the gamut 200 is in the vicinity of the boundary of the gamut 200, then it is preferable that a frame, which is represented by a thick line, be applied to the periphery of the color patch 36 that corresponds to the color, and that a thick-framed color patch 46 be printed (see FIG. 2B). The operator can thus make color adjustments knowing that the designated color is in the vicinity of the boundary of the gamut 200.

In order to clearly show whether or not the color patches 36 belong to the gamut 200, the color patches 36 should preferably be displayed in different forms, e.g., as black patches 44 and as thick-framed color patches 46, as shown in FIG. 2B.

The identification mark is not limited to those shown in FIG. 2B. Rather, the black patches 44 may be white patches (not printed), or certain identification marks (○, x, etc.) may be applied around the color patches 36.

Furthermore, the display device 24 may display a warning concerning color patches 36 which do not belong to the gamut 200, or which belong to the gamut 200 but are in the vicinity of the boundary of the gamut 200. In addition, radio buttons 102 that correspond to the black patches 44 on the setting image 100 (see FIG. 4) may be displayed as passive buttons in order to prevent the black patches 44 from being selected, thereby allowing an appropriate color to be selected using the remaining selectable radio buttons 102, which are displayed as active buttons, i.e., thereby allowing an appropriate color to be selected from among the colors within the gamut 200.

In FIG. 12B, the next presentation area 214 is partially present outside of the gamut 200. However, the next presentation area 214 may be provided so as not to exist outside of the gamut 200.

Figure 13:
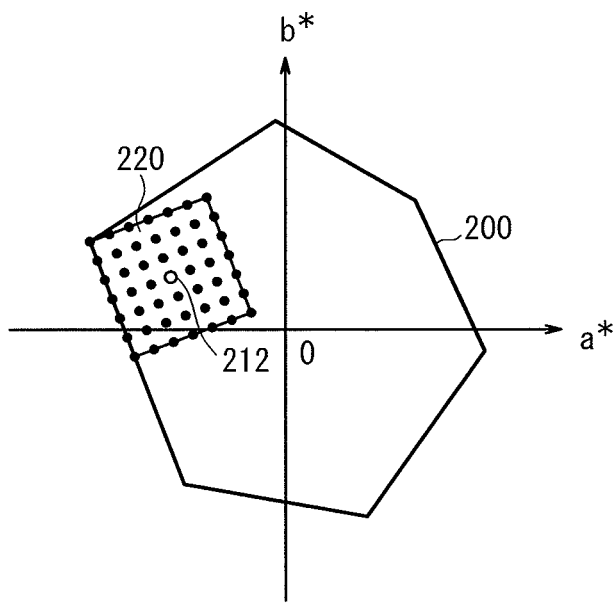
FIG. 13 is a diagram showing a next presentation area formed by the designated color adjusting color chart according to the embodiment.

FIG. 13 is a diagram showing a next presentation area 220 of the designated color adjusting color chart 34c. A comparison between the next presentation area 220 and the next presentation area 214 shown in FIG. 12B indicates that the next reference color 212 is in the same position, however, the next presentation areas 214, 220 have different shapes. More specifically, the next presentation area 220 is rotated through a certain angle about an L* axis, and has sides (color difference intervals) shorter than those of the next presentation area 214.

The next presentation area 220 having thus been established, all of the colors of the next presentation area 220 fall within the gamut 200. Since the number of selectable color patches 36 is increased for a single image evaluating process (see step S4 in FIG. 5), the image evaluating process can be performed efficiently. The same advantages can be achieved by appropriately reestablishing not only the color difference interval, but also the next reference color 212.

In view of distortions of the equal color space according to CIE or the like, i.e., a shift in the corresponding relationship between numerical values of the colors and visual sensitivity characteristics, the color difference interval ($\Delta L^*$, $\Delta a^*$, $\Delta b^*$) can be established depending on the reference color (L*, a*, b*), thereby causing the numerical values of the colors to approach the visual sensitivity characteristics. In other words, it is preferable to establish the color difference interval such that the color difference interval is relatively small in an area where visual sensitivity characteristics are high, whereas the color difference interval is relatively large in an area where visual sensitivity characteristics are low.

The designated color adjusting color chart 34c is printed based on the next reference color 212 and the color difference interval thus reestablished. This process is canceled when the "CANCEL" button 122 is pressed during adjustment of the designated color (step S62).

The above process is repeated until a color that is identical to the designated color is reproduced on the designated color adjusting color chart 34c. When the "FINALIZE" button 120 is pressed, the profile is changed (step S629), whereupon the process for adjusting a designated color is brought to an end.

The present invention is not limited to the above embodiment. Various changes and modifications can be made without departing from the scope of the invention, for example, as indicated by (1) through (6) below.

(1) In the above embodiment, color chart conditions (reference colors and color difference intervals) are automatically set by the color chart condition setter 84. However, specification changes may be made in view of preferences of the operator or the client as to color selections.

More specifically, the display windows 114, 116 may include text boxes, which display recommended values set by the color chart condition setter 84. The operator may change the displayed values and/or set the changed values using the keyboard 28, etc. The operator may freely change the number of color patches 36.

(2) In the above embodiment, the color patches 36 of the designated color adjusting color chart 34c are rectangular in shape. However, the color patches 36 are not limited to being rectangular in shape, but may be of a triangular shape, a hexagonal shape, a circular shape, or the like.

The color patches 36 may be arranged in any of various layouts, insofar as their corresponding relationship to the identification information is clear. For example, if the color patches 36 are of a regular hexagonal shape, then the color patches 36 may be arranged in a honeycomb pattern.

(3) In the above embodiment, the row numbers 38 and the column numbers 40 (see FIG. 2A) included in the designated color adjusting color chart 34c are entered as identification information into the setting image 100 (see FIG. 4). However, the identification information may be entered in other ways. For example, an intermediate color between adjacent color patches 36 may be entered using a GUI controller, such as a color wheel or the like. Further, the color sample number, the colorimetric value, or the like, corresponding to the selected color patch 36 may be entered directly.

(4) With respect to distortions of the equal color space referred to above, the color difference interval may be established in view of (a) the tendency of highly saturated colors to be less sensitive to changes in the direction of saturation, (b) the tendency of a green range to be less sensitive to changes in hues, (c) the tendency of highly light colors or lowly light colors to be less sensitive to changes in lightness, and (d) the tendency of a blue range to be less sensitive to changes in the direction of saturation.

(5) If it is impossible or difficult for the printing machine 18 to reproduce a designated color, then the designated color outside of the gamut 200 needs to be replaced with a color inside the gamut 200. In this case, the profile can be changed based on any of various gamut mapping algorithms. For example, it is preferable to select a color close to the boundary of the gamut 200 in order to minimize the color difference between those colors, while keeping a lightness difference (or saturation difference) between the colors within an allowable range, for example.

(6) In the above embodiment, the printing machine 18 comprises an inkjet printing apparatus. However, the printing machine 18 may comprise an electrophotographic apparatus, a thermosensitive apparatus, or the like. The printing machine 18 may output not only a hard copy, but also a soft copy. Stated otherwise, the printing machine 18 may comprise any of various image display apparatus for displaying images based on various principles.

Although a certain preferred embodiment of the present invention has been shown and described in detail, it should be understood that various changes and modifications may be made to the embodiment without departing from the scope of the invention as set forth in the appended claims.

What is claimed is:

1. An image processing apparatus comprising:
an image data generator for generating image data to print a color chart having a plurality of color patches of respective colors on a print medium;
an input device for entering identification information of one of the color patches, which is selected from the color chart printed based on the image data, as having a color closest to a designated color;
a color converter for making a color adjustment of a print based on the identification information entered by the input device; and
a setter for setting colorimetric values of the designated color as a reference color,
wherein the image data generator generates image data of pixel values calculated such that the color patches are arranged in a two-dimensional pattern on the print medium around the reference color set by the setter, and color differences in an equal color space between adjacent ones of the color patches are represented by a substantially equal interval along a row or column of color patches;

wherein the input device enters a judgment result as to whether or not the designated color is present within the range of the colors of the color patches of the printed color chart; and the setter resets a color corresponding to the identification information as the reference color, when the judgment result indicating that the designated color is present and the identification information are entered by the input device.

2. An image processing apparatus according to claim 1, wherein the setter further sets the interval of the color differences, and resets the interval of the color differences as a smaller interval, when the judgment result indicating that the designated color is present is entered by the input device.

3. An image processing apparatus according to claim 1, wherein the setter further sets the interval of the color differences, and resets the reference color or the interval of the color differences, so that all the pixel values of the color patches represented by the image data generated by the image data generator represent colors within the range of a gamut of the print.

4. An image processing apparatus according to claim 1, wherein the image data generator generates the image data including identification marks added to the color patches, when the colors in the equal color space, which correspond to the color patches, represent colors outside of the range of a gamut of the print.

5. An image processing apparatus according to claim 1, wherein the image data generator generates the image data including identification marks added to the color patches when the colors in the equal color space, which correspond to the color patches, represent colors falling within the range of a gamut of the print and in the vicinity of the boundary of the gamut.

6. An image processing apparatus according to claim 1, wherein the image data generator corrects pixel values of the image data based on acquired colorimetric values of the color patches.

7. An image processing apparatus according to claim 1, wherein all of the pixel values corresponding to the color patches are determined so as to fall within a range of a gamut of the print by rotation around an axis of the equal color space.

8. An image processing method of printing a color chart having a plurality of color patches of respective colors on a print medium, selecting one of the color patches from the color chart as having a color closest to a designated color, and making a color adjustment of a print based on identification information of the selected color patch, comprising the steps of:

setting colorimetric values of the designated color as a reference color; and generating image data of pixel values calculated such that the color patches are arranged in a two-dimensional pattern on the print medium around the set reference color, and color differences in an equal color space between adjacent ones of the color patches are represented by a substantially equal interval along a row or column of color patches;

entering a judgment result as to whether or not the designated color is present within the range of the colors of the color patches of the printed color chart; and resetting a color corresponding to the identification information as the reference color, when the judgment result indicating that the designated color is present and the identification information are entered.

9. An image processing method according to claim 8, wherein all of the pixel values corresponding to the color patches are determined so as to fall within a range of a gamut of the print by rotation around an axis of the equal color space.

10. A non-transitory computer-readable recording medium storing a program for enabling a computer to perform an image processing process to make a color adjustment of a print, the program further enabling the computer to perform the functions of:

setting colorimetric values of a designated color as a reference color;

generating image data of pixel values calculated such that a plurality of color patches are arranged in a two-dimensional pattern on a print medium around the set reference color, and color differences in an equal color space between adjacent ones of the color patches are represented by a substantially equal interval along a row or column of color patches;

printing a color chart on the print medium based on the image data; and making a color adjustment of the print based on identification information of one of the color patches, which is selected from the color chart as having a color closest to the designated color;

entering a judgment result as to whether or not the designated color is present within the range of the colors of the color patches of the printed color chart; and resetting a color corresponding to the identification information as the reference color, when the judgment result indicating that the designated color is present and the identification information are entered.

11. An image processing method according to claim 8, wherein setting the colorimetric values of the designated color as the reference color occurs before generating of image data of the pixel values.

* * * * *